(12) United States Patent
Ishizeki

(10) Patent No.: US 11,958,337 B2
(45) Date of Patent: Apr. 16, 2024

(54) VEHICLE AIR CONDITIONING APPARATUS

(71) Applicant: SANDEN AUTOMOTIVE CLIMATE SYSTEMS CORPORATION, Isesaki (JP)

(72) Inventor: Tetsuya Ishizeki, Isesaki (JP)

(73) Assignee: SANDEN CORPORATION, Isesaki (JP)

( * ) Notice: Subject to any disclaimer, the term of this patent is extended or adjusted under 35 U.S.C. 154(b) by 338 days.

(21) Appl. No.: 17/625,305

(22) PCT Filed: Jul. 17, 2020

(86) PCT No.: PCT/JP2020/027793
§ 371 (c)(1),
(2) Date: Jan. 6, 2022

(87) PCT Pub. No.: WO2021/020162
PCT Pub. Date: Feb. 4, 2021

(65) Prior Publication Data
US 2022/0363110 A1 Nov. 17, 2022

(30) Foreign Application Priority Data
Jul. 29, 2019 (JP) ................................. 2019-138530

(51) Int. Cl.
*B60H 1/32* (2006.01)
*B60H 1/00* (2006.01)
(Continued)

(52) U.S. Cl.
CPC ......... *B60H 1/323* (2013.01); *B60H 1/00021* (2013.01); *B60H 1/00921* (2013.01);
(Continued)

(58) Field of Classification Search
CPC ............... B60H 1/323; B60H 1/00021; B60H 1/00921; B60H 1/22; B60H 1/2215;
(Continued)

(56) References Cited

U.S. PATENT DOCUMENTS 5,701,753 A * 12/1997 Iritani ................. B60H 1/3205
62/211
5,878,589 A * 3/1999 Tanaka ..................... F25B 1/10
165/80.2
(Continued)

FOREIGN PATENT DOCUMENTS

DE 112015002649 T5 * 2/2017 ......... B60H 1/00385
JP 5440426 B2 3/2014
(Continued)

OTHER PUBLICATIONS

The State Intellectual Property Office of the People's Republic of China, The First Office Action issued in Chinese Patent Application No. 202080051096.8, dated Oct. 13, 2023.
(Continued)

*Primary Examiner* — Ljiljana V. Ciric
(74) *Attorney, Agent, or Firm* — Baker Botts L.L.P.

(57) ABSTRACT

A cooling and battery cooling mode is performed to release the heat from the refrigerant in a heat releasing unit and an outdoor heat exchanger and to absorb the heat into the refrigerant in a heat absorbing unit and a refrigerant-heat medium heat exchanger, and a heating and battery cooling mode is performed to release the heat from the refrigerant in the heat releasing unit and to absorb the heat into the refrigerant in the outdoor heat exchanger and the in-vehicle device heat exchanger. In a case where the cooling and battery cooling mode is performed, when a temperature of the heat absorbing unit is lower than a target value of the temperature of the heat absorbing unit even though the flowing of the refrigerant into the heat absorbing unit is blocked, the operation mode is moved to the heating and battery cooling mode.

20 Claims, 3 Drawing Sheets

(51) Int. Cl.
*B60H 1/22* (2006.01)
*F25B 5/02* (2006.01)
*F25B 5/04* (2006.01)
*F25B 25/00* (2006.01)
*F25B 41/20* (2021.01)

(52) U.S. Cl.
CPC ............. *B60H 1/22* (2013.01); *B60H 1/2215* (2013.01); *B60H 1/3205* (2013.01); *B60H 1/3213* (2013.01); *F25B 5/02* (2013.01); *F25B 5/04* (2013.01); *F25B 41/20* (2021.01); *B60H 2001/00121* (2013.01); *B60H 2001/00278* (2013.01); *B60H 2001/00928* (2013.01); *F25B 25/005* (2013.01); *F25B 2400/0403* (2013.01); *F25B 2600/2501* (2013.01); *F25B 2600/2519* (2013.01)

(58) Field of Classification Search
CPC ................ B60H 1/3205; B60H 1/3213; B60H 1/00278; B60H 2001/00121; B60H 2001/00928; B60H 1/32; F25B 5/02; F25B 5/04; F25B 41/20; F25B 25/005; F25B 2400/0403; F25B 2600/2501; F25B 2600/2519
See application file for complete search history.

(56) References Cited

U.S. PATENT DOCUMENTS

| | | | |
|---|---|---|---|
| 9,796,237 B2 | 10/2017 | Miyakoshi et al. | |
| 10,183,554 B2* | 1/2019 | Ishizeki | B60H 1/3222 |
| 11,077,736 B2* | 8/2021 | Ishizeki | B60H 1/00278 |
| 11,485,191 B2* | 11/2022 | Ishizeki | B60H 1/143 |
| 11,760,162 B2* | 9/2023 | Dong | F25B 41/325 |
| | | | 62/324.1 |
| 11,772,449 B2* | 10/2023 | Ishizeki | B60H 1/00921 |
| | | | 62/259.2 |
| 11,794,548 B2* | 10/2023 | Ishizeki | B60H 1/32011 |
| 2001/0035286 A1* | 11/2001 | Kobayashi | F25B 41/34 |
| | | | 165/231 |
| 2012/0255319 A1* | 10/2012 | Itoh | F25B 41/20 |
| | | | 62/226 |
| 2014/0298830 A1* | 10/2014 | Won | B60H 1/00007 |
| | | | 62/238.7 |
| 2020/0122544 A1 | 4/2020 | Ishizeki | |
| 2022/0305883 A1* | 9/2022 | Ishizeki | F25B 5/02 |
| 2022/0363110 A1* | 11/2022 | Ishizeki | F25B 41/20 |
| 2023/0271478 A1* | 8/2023 | Dong | B60H 1/32284 |

FOREIGN PATENT DOCUMENTS

| | | |
|---|---|---|
| JP | 5668700 B2 | 2/2015 |
| JP | 5999637 B2 | 9/2016 |
| WO | 2018/193770 A1 | 10/2018 |
| WO | 2018/198582 A1 | 11/2018 |

OTHER PUBLICATIONS

Japan Patent Office, International Search Report issued in International Application No. PCT/JP2020/027793, dated Sep. 24, 2020.

* cited by examiner

VEHICLE AIR CONDITIONING APPARATUS

CROSS-REFERENCE TO RELATED APPLICATIONS

This application is a U.S. National Stage Patent Application under 37 U.S.C. § 371 of International Patent Application No. PCT/JP2020/027793, filed on Jul. 17, 2020, which claims the benefit of Japanese Patent Application No. JP 2019-138530, filed on Jul. 29, 2019, the disclosures of each of which are incorporated herein by reference in their entirety.

TECHNICAL FIELD

The present invention relates to a heat pump type air conditioning apparatus configured to condition the air in the vehicle compartment of a vehicle, and more specifically to a vehicle air conditioning apparatus capable of cooling the temperature of a device equipped in a vehicle.

BACKGROUND ART

Due to actualization of environmental problems in recent years, a hybrid vehicle and an electric vehicle having a traction motor driven by electric power supplied from a battery equipped in the vehicle have become widespread. Then, an air conditioning apparatus applicable to this sort of vehicles has been developed. The air conditioning apparatus includes a compressor, a heat releasing unit, a heat absorbing unit, and a refrigerant circuit to which an outdoor heat exchanger is connected, and is configured to heat the vehicle compartment by releasing heat from a refrigerant discharged from the compressor in the heat releasing unit, and, in the outdoor heat exchanger, absorbing the heat into this refrigerant having released the heat in the heat releasing unit, and to cool the vehicle compartment by releasing the heat from the refrigerant discharged from the compressor in the outdoor heat exchanger and absorbing the heat into the refrigerant in the heat absorbing unit (see, for example, Patent Literature 1).

In the meantime, when a battery (in-vehicle device) is charged or discharged under a condition that its temperature is increased due to self-heating and so forth, the deterioration of the battery progresses, and this leads to a risk of failure of the operation and damage. To address this, there has been developed an air conditioning apparatus including a refrigerant-heat medium heat exchanger (in-vehicle device heat exchanger) configured to perform a heat exchange between the refrigerant circulating through the refrigerant circuit and the heat medium. Then, the refrigerant absorbs the heat in this refrigerant-heat medium heat exchanger to cool the heat medium (water), and the cooled heat medium (water) is circulated through the battery, thereby to cool the battery (see, for example, Patent Literatures 2 and 3).

CITATION LIST

Patent Literature

PTL1: Japanese Patent No. 5999637
PTL2: Japanese Patent No. 5668700
PTL3: Japanese Patent No. 5440426

SUMMARY OF INVENTION

Technical Problem

Here, during the cooling, the air supplied to the vehicle compartment is flowed to the heat releasing unit by using an air mix damper to adjust the temperature of the air blowing to the vehicle compartment (reheating). Conventionally, for example, when the heating performance of the heat releasing unit is not achieved, the operation is moved from the cooling to the dehumidification and so forth, as described in Patent Literature 1.

On the other hand, in a case where the battery is cooled while the cooling of the vehicle compartment is performed, when, for example, the outdoor air temperature is reduced and therefore the temperature of the heat absorbing unit is lower than the target value, there is no need to flow the refrigerant to the heat absorbing unit. However, even though the flowing of the refrigerant into the heat absorbing unit is blocked in this situation, the refrigerant flows in the in-vehicle device heat exchanger, and therefore the circuit is not blocked and the operation is continued.

In this case, for example, when the operation is moved to another operation under the condition where the heating performance of the heat releasing unit is not achieved in the same way as the conventional control, the cooling of the vehicle compartment by releasing the heat from the refrigerant in the outdoor heat exchanger is continued until the heating performance of the heat releasing unit cannot be achieved. This causes a problem that a state of lacking the heating performance to heat the vehicle compartment lasts, and therefore auxiliary heating by an electric heater is needed.

The present invention has been achieved to solve the conventional technical problems, and it is therefore an object of the invention to provide a vehicle air conditioning apparatus capable of cooling an in-vehicle device while conditioning the air in the vehicle compartment, improving the heating performance to heat the vehicle compartment, and saving energy.

Solution to Problem

The vehicle air conditioning apparatus according to the invention includes: a compressor configured to compress a refrigerant; a heat releasing unit configured to release heat from the refrigerant and heat air to be supplied to a vehicle compartment; an outdoor heat exchanger provided outside the vehicle compartment and configured to absorb the heat into the refrigerant or release the heat from the refrigerant; a heat absorbing unit configured to absorb the heat into the refrigerant and cool the air to be supplied to the vehicle compartment; an in-vehicle device heat exchanger configured to absorb the heat into the refrigerant and cool an in-vehicle device; an outdoor heat exchanger valve device configured to control flowing of the refrigerant into the outdoor heat exchanger; a heat absorbing unit valve device configured to control flowing of the refrigerant into the heat absorbing unit; and a controller configured to be able to perform at least: a first operation mode to cool the vehicle compartment and the in-vehicle device by releasing the heat from the refrigerant discharged from the compressor in the heat releasing unit and/or the outdoor heat exchanger and absorbing the heat into the refrigerant in the heat absorbing unit and the in-vehicle device heat exchanger; and a second operation mode to heat the vehicle compartment and cool the in-vehicle device by releasing the heat from the refrigerant discharged from the compressor in the heat releasing unit and absorbing the heat into the refrigerant in the outdoor heat exchanger and/or the in-vehicle device heat exchanger. In a case where the first operation mode is performed, when a temperature of the heat absorbing unit is lower than a target value of the temperature of the heat absorbing unit even though the heat absorbing unit valve device prevents the refrigerant from flowing into the heat absorbing unit, the controller moves the operation mode to the second operation mode.

In the vehicle air conditioning apparatus recited in claim 2, in the first operation mode, the controller controls operation of the compressor based on an index indicating a temperature of the in-vehicle device, and controls the heat absorbing unit valve device based on the temperature of the heat absorbing unit. In a case where the first operation mode is performed, when the temperature of the heat absorbing unit is lower than the target value of the temperature of the heat absorbing unit even though the heat absorbing unit valve device becomes a state to prevent the refrigerant from flowing into the heat absorbing unit, the controller moves the operation mode to the second operation mode.

In the vehicle air conditioning apparatus recited in claim 3, the heat absorbing unit and the in-vehicle device heat exchanger are connected in parallel downstream of a first branching portion with respect to refrigerant flow. The first branching portion is located on an outlet side of the outdoor heat exchanger from which the refrigerant is discharged.

The vehicle air conditioning apparatus recited in claim 4 further includes: a bypass circuit branching from a second branching portion located on an outlet side of the heat releasing unit from which the refrigerant is discharged, and configured to bypass the outdoor heat exchanger and communicate with the first branching portion; and a bypass circuit valve device configured to control flowing of the refrigerant into the bypass circuit.

In the vehicle air conditioning apparatus recited in claim 5, in the first operation mode, the controller flows the refrigerant discharged from the compressor in an order of the outdoor heat exchanger valve device, the outdoor heat exchanger, the first branching portion, the heat absorbing unit valve device, and the heat absorbing unit, branches the refrigerant by the first branching portion, and flows the refrigerant to the in-vehicle device heat exchanger. In the second operation mode, the controller flows the refrigerant discharged from the compressor in an order of the heat releasing unit, the second branching portion, the outdoor heat exchanger valve device, and the outdoor heat exchanger, branches the refrigerant from the second branching portion into the bypass circuit, and flows the refrigerant to the in-vehicle device heat exchanger.

In the vehicle air conditioning apparatus recited in claim 6, the outdoor heat exchanger valve device is an electric expansion valve which can be fully closed.

In the vehicle air conditioning apparatus recited in claim 7, the heat absorbing unit valve device is an electric expansion valve which can be fully closed, or a combination of an expansion valve and a solenoid valve.

The vehicle air conditioning apparatus recited in claim 8 further includes an auxiliary expansion valve configured to decompress the refrigerant flowing into the in-vehicle device heat exchanger.

Advantageous Effect

According to the invention, the vehicle air conditioning apparatus includes a compressor configured to compress a refrigerant; a heat releasing unit configured to release heat from the refrigerant and heat air to be supplied to a vehicle compartment; an outdoor heat exchanger provided outside the vehicle compartment and configured to absorb the heat into the refrigerant or release the heat from the refrigerant; a heat absorbing unit configured to absorb the heat into the refrigerant and cool the air to be supplied to the vehicle compartment; an in-vehicle device heat exchanger configured to absorb the heat into the refrigerant and cool an in-vehicle device; an outdoor heat exchanger valve device configured to control flowing of the refrigerant into the outdoor heat exchanger; a heat absorbing unit valve device configured to control flowing of the refrigerant into the heat absorbing unit; and a controller configured to be able to perform at least: a first operation mode to cool the vehicle compartment and the in-vehicle device by releasing the heat from the refrigerant discharged from the compressor in the heat releasing unit and/or the outdoor heat exchanger and absorbing the heat into the refrigerant in the heat absorbing unit and the in-vehicle device heat exchanger; and a second operation mode to heat the vehicle compartment and cool the in-vehicle device by releasing the heat from the refrigerant discharged from the compressor in the heat releasing unit and absorbing the heat into the refrigerant in the outdoor heat exchanger and/or the in-vehicle device heat exchanger.

In a case where the first operation mode is performed, when a temperature of the heat absorbing unit is lower than a target value of the temperature of the heat absorbing unit even though the heat absorbing unit valve device prevents the refrigerant from flowing into the heat absorbing unit, the controller moves the operation mode to the second operation mode. Therefore, in a state where there is no need to flow the refrigerant to the heat absorbing unit, the operation mode is moved from the first operation mode to the second operation mode. By this means, it is possible to improve the heating performance to heat the vehicle compartment. In addition, there is no need to continue the first operation mode and perform the auxiliary heating by an electric heater and so forth, and therefore it is possible to contribute to energy saving.

For example, as the invention recited in claim 2, in the first operation mode, the controller controls operation of the compressor based on an index indicating a temperature of the in-vehicle device, and controls the heat absorbing unit valve device based on the temperature of the heat absorbing unit, and in a case where the first operation mode is performed, when the temperature of the heat absorbing unit is lower than the target value of the temperature of the heat absorbing unit even though the heat absorbing unit valve device becomes a state to prevent the refrigerant from flowing into the heat absorbing unit, the controller moves the operation mode to the second operation mode. By this means, it is possible to effectively improve the heating performance to heat the vehicle compartment.

The above-described subject matters are significantly effective for the vehicle air conditioning apparatus recited in, for example, claims 3 to 8.

DESCRIPTION OF EMBODIMENTS

Figure 1:
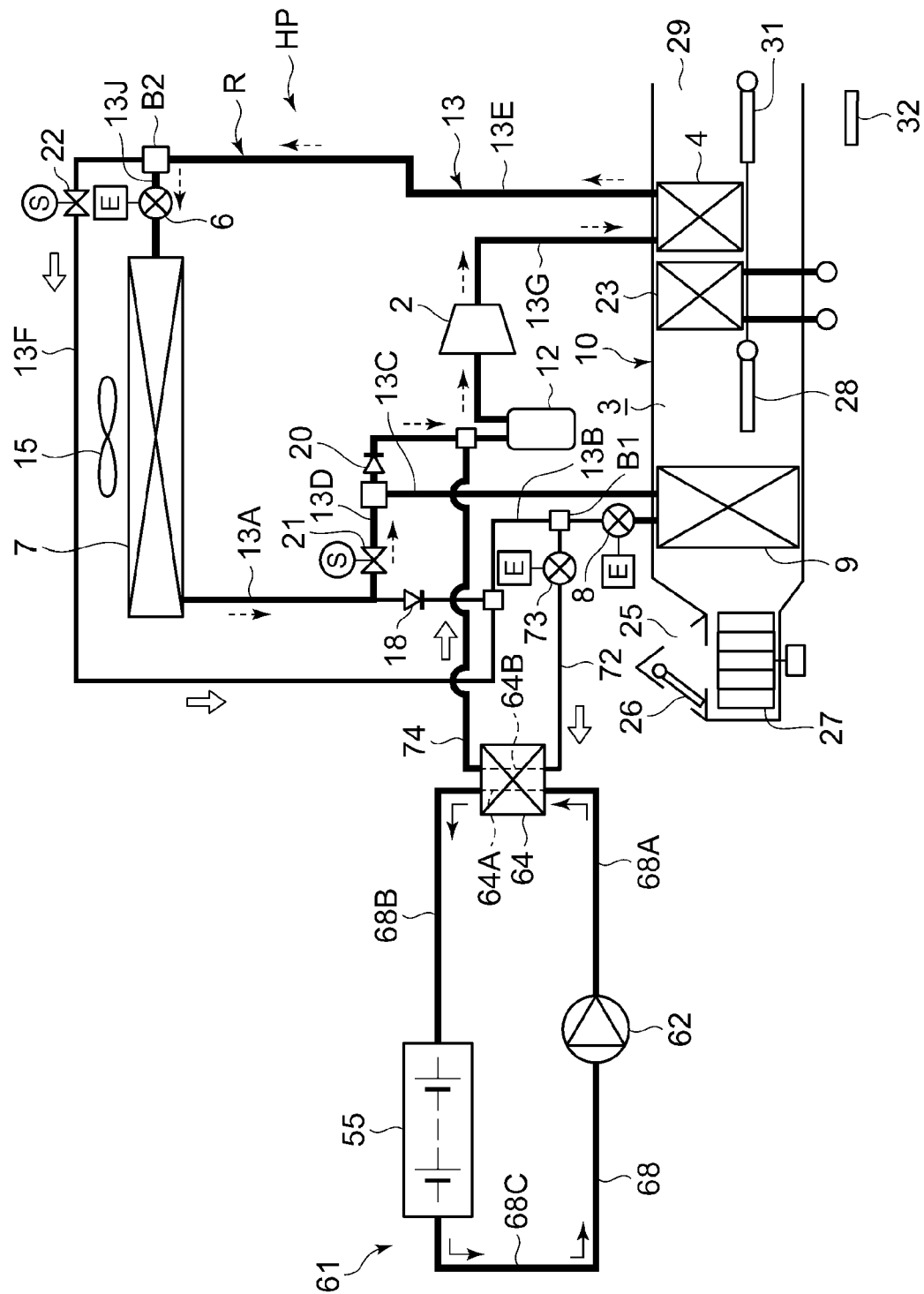
FIG. 1 is a configuration diagram illustrating a vehicle air conditioning apparatus according to an embodiment of the invention (a heating and battery cooling mode: a second operation mode)

Hereinafter, an embodiment of the invention will be described in detail with reference to the drawings. FIG. 1 is a configuration diagram illustrating a vehicle air conditioning apparatus 1 according to an embodiment of the invention. A vehicle according to the embodiment of the invention is an electric vehicle (EV) without an engine (internal combustion). The vehicle includes a battery 55 (e.g., a lithium-ion battery) and is configured to run by a traction motor (electric motor) driven by the electric power supplied from the battery 55 charged by an external power supply. Also the vehicle air conditioning apparatus 1 is driven by the electric power supplied from the battery 55.

That is, for the electric vehicle which cannot be heated by using the waste heat of an engine, the vehicle air conditioning apparatus 1 is configured to heat the vehicle compartment by a heat pump device HP including a refrigerant circuit R, and to cool the battery 55 while conditioning the air in the vehicle compartment, by selectively performing the cooling and the dehumidification. Here, without mentioning, the present invention is effective for a vehicle, not only for an electric vehicle but also for a so-called hybrid vehicle using both an engine and a traction electric motor.

The vehicle air conditioning apparatus 1 according to the embodiment is configured to condition (heat, cool, dehumidify, and ventilate) the air in the vehicle compartment of an electric vehicle, and includes: a compressor (electric compressor) 2 configured to be supplied with power from the battery 55 and compress a refrigerant; a heat releasing unit 4 provided in an air flow passage 3 of an HVAC unit 10 through which the air in the vehicle compartment is ventilated and circulated, and configured to release the heat from a high-temperature and high-pressure refrigerant discharged from the compressor 2 and flowed into the heat releasing unit 4 via a refrigerant pipe 13G to heat the air to be supplied to the vehicle compartment; an outdoor expansion valve 6 as an outdoor heat exchanger valve device, which is an electric expansion valve configured to decompress and expand the refrigerant during the heating; an outdoor heat exchanger 7 which is configured to perform a heat exchange between the refrigerant and the outdoor air to function as a condenser configured to release the heat from the refrigerant during the cooling and as an evaporator to absorb the heat into the refrigerant during the heating; an indoor expansion valve 8 as a heat absorbing unit valve device, which is an electric expansion valve configured to decompress and expand the refrigerant; a heat absorbing unit 9 provided in the air flow passage 3 and configured to absorb the heat into the refrigerant from the inside and the outside of the vehicle compartment during the cooling (dehumidification) to cool the air to be supplied to the vehicle compartment; and an accumulator 12. These components are connected in sequence by a refrigerant pipe 13 to form the refrigerant circuit R of the heat pump device HP. The outdoor expansion valve 6 and the indoor expansion valve 8 are configured to decompress and expand the refrigerant, and can be fully opened and closed.

Here, an outdoor blower 15 is provided in the outdoor heat exchanger 7. This outdoor blower 15 is configured to forcibly ventilate the outdoor air to the outdoor heat exchanger 7 to perform a heat exchange between the outdoor air and the refrigerant, thereby to ventilate the outdoor air to the outdoor heat exchanger 7 even when the vehicle is stopped (that is, the vehicle speed is 0 km/h).

In addition, a refrigerant pipe 13A connected to the outlet side of the outdoor heat exchanger 7 from which the refrigerant is discharged is connected to a refrigerant pipe 13B via a check valve 18. Here, the forward direction of the check valve 18 is toward the refrigerant pipe 13B, and the refrigerant pipe 13B is connected to the indoor expansion valve 8.

Moreover, the refrigerant pipe 13A extending from the outdoor heat exchanger 7 is branched, and a branched refrigerant pipe 13D is communicably connected to a refrigerant pipe 13C located on the outlet side of the heat absorbing unit 9 via a solenoid valve 21 which is opened during the heating. Then, a check valve 20 is connected to the refrigerant pipe 13C downstream of the connection point of the refrigerant pipe 13D, and the refrigerant pipe 13C downstream of the check valve 20 is connected to the accumulator 12, and the accumulator 12 is connected to the suction side of the compressor 2 from which the refrigerant is sucked. Here, the forward direction of the check valve 20 is toward the accumulator 12.

Moreover, a refrigerant pipe 13E on the outlet side of the heat releasing unit 4 is branched into a refrigerant pipe 13J and a refrigerant pipe 13F at a branching portion B2 (second branching portion) located upstream of the outdoor expansion valve 6 (with respect to the refrigerant flow and on the outlet side of the heat releasing unit 4 from which the refrigerant is discharged), and one of the branched refrigerant pipes, the refrigerant pipe 13J is connected to the inlet side of the outdoor heat exchanger 7 into which the refrigerant flows via the outdoor expansion valve 6. Meanwhile, the other of the branched refrigerant pipes, the refrigerant pipe 13F is communicably connected to the refrigerant pipe 13B located downstream of the check valve 18 and upstream of the indoor expansion valve 8 with respect to the refrigerant flow, via a solenoid valve 22 as a bypass circuit valve device which is opened during the dehumidification.

By this means, the refrigerant pipe 13F is connected in parallel to a series circuit including the outdoor expansion valve 6, the outdoor heat exchanger 7 and the check valve 18, and becomes a bypass circuit configured to bypass the outdoor expansion valve 6, the outdoor heat exchanger 7, and the check valve 18.

In addition, an outdoor air suction port and an indoor air suction port (representatively illustrated as "suction port 25" in FIG. 1) are formed upstream of the heat absorbing unit 9 with respect to the air flow in the air flow passage 3. A suction switching damper 26 is provided in the suction port 25 and configured to switch the air introduced into the air flow passage 3 between the indoor air which is the air in the vehicle compartment (indoor air circulation) and the outdoor air which is the air outside the vehicle compartment (outdoor air introduction). Moreover, an indoor blower (blower fan) 27 is provided downstream of the suction switching damper 26 with respect to the air flow and configured to supply the introduced indoor air and outdoor air to the air flow passage 3.

Moreover, in FIG. 1, reference sign 23 denotes an auxiliary heater as an auxiliary heating device. This auxiliary heater 23 is an electric heater such as a PTC heater, and is provided in the air flow passage 3 upwind of the heat releasing unit 4 with respect to the air flow of the air flow passage 3. The auxiliary heater 23 is configured to be able to assist the heating of the vehicle compartment by sending an electric current to the auxiliary heater 23.

In addition, an air mix damper 28 is provided upstream of the heat releasing unit 4 with respect to the air flow in the air flow passage 3 and configured to adjust the ratio between the auxiliary heater 23 and the heat releasing unit 4 to which the air (the indoor air and the outdoor air) having flowed into the air flow passage 3 and passed through the heat absorbing unit 9 is ventilated. Moreover, FOOT, VENT, and DEF which are blowing outlets (representatively illustrated as "blowing outlet 29" in FIG. 1) are provided downstream of the heat releasing unit 4 with respect to the air flow in the air flow passage 3. An blowing outlet switching damper 31 is provided in the blowing outlet 29 and configured to control the switching among the blowing outlets from which the air blows.

Furthermore, the vehicle air conditioning apparatus 1 includes a heat medium circulation circuit 61 configured to circulate heat medium through the battery 55 to adjust the temperature of the battery 55. That is, with the embodiment, the battery 55 is an in-vehicle device according to the invention.

This heat medium circulation circuit 61 according to the embodiment includes a circulating pump 62 as a circulating device, and a refrigerant-heat medium heat exchanger 64 as an in-vehicle device heat exchanger. The circulating pump 62, the refrigerant-heat medium heat exchanger 64, and the battery 55 are connected by a heat medium pipe 68.

In the case of the embodiment, a heat medium pipe 68A is connected to the discharge side of the circulating pump 62, and also connected to the inlet of a heat medium flow path 64A of the refrigerant-heat medium heat exchanger 64. Then, a heat medium pipe 68B is connected to the outlet of the heat medium flow path 64A and also connected to the inlet of the battery 55. Then, the outlet of the battery 55 is connected to a heat medium pipe 68C, and the heat medium pipe 68C is connected to the suction side of the circulating pump 62.

As the heat medium used in the heat medium circulation circuit 61, for example, water, a refrigerant such as HFO-1234yf, liquid such as coolant, and gas such as air may be adopted. Here, with the embodiment, water is adopted as the heat medium. In addition, for example, a jacket structure is applied to the periphery of the battery 55. The heat medium can flow through the jacket structure while heat exchanging with the battery 55.

Meanwhile, one end of a branching pipe 72 as a branching circuit is connected to the outlet of the refrigerant pipe 13F of the refrigerant circuit R, that is, a branching portion B1 (first branching portion) of the refrigerant pipe 13B located downstream of the junction of the refrigerant pipe 13F and the refrigerant pipe 13B and upstream of the indoor expansion valve 8 with respect to the refrigerant flow. An auxiliary expansion valve 73 which is an electric expansion valve is provided in the branching pipe 72. This auxiliary expansion valve 73 is configured to decompress and expand the refrigerant flowing into the above-described refrigerant flow path 64B of the refrigerant-heat medium heat exchanger 64, and can be fully closed.

On the other hand, the other end of the branching pipe 72 is connected to the refrigerant flow path 64B of the refrigerant-heat medium heat exchanger 64. One end of the refrigerant pipe 74 is connected to the outlet of the refrigerant flow path 64B, and the other end of the refrigerant pipe 74 is connected to the refrigerant pipe 13C downstream of the check valve 20 and upstream of the accumulator 12 with respect to the refrigerant flow. Then, the auxiliary expansion valve 73 and so forth constitute part of the refrigerant circuit R of the heat pump device HP, and also constitute part of the heat medium circulation circuit 61.

The branching portion B1 is located on the outlet side of the outdoor heat exchanger 7 from which the refrigerant is discharged, and the heat absorbing unit 9 and the refrigerant-heat medium heat exchanger 64 are connected in parallel downstream of the branching portion B1 with respect to the refrigerant flow. In addition, with the embodiment, the refrigerant pipe 13F (bypass circuit) communicates with the branching portion B1 via the refrigerant pipe 13B.

When the auxiliary expansion valve 73 is open, (part or all of) the refrigerant having exited the refrigerant pipe 13F and the outdoor heat exchanger 7 flows into the branching pipe 72, and is decompressed by the auxiliary expansion valve 73, and then flows into the refrigerant flow path 64B of the refrigerant-heat medium heat exchanger 64 and evaporates there. While flowing through the refrigerant flow path 64B, the refrigerant absorbs the heat from the heat medium flowing through the heat medium flow path 64A, and then passes through the accumulator 12 and is sucked into the compressor 2.

Figure 2:
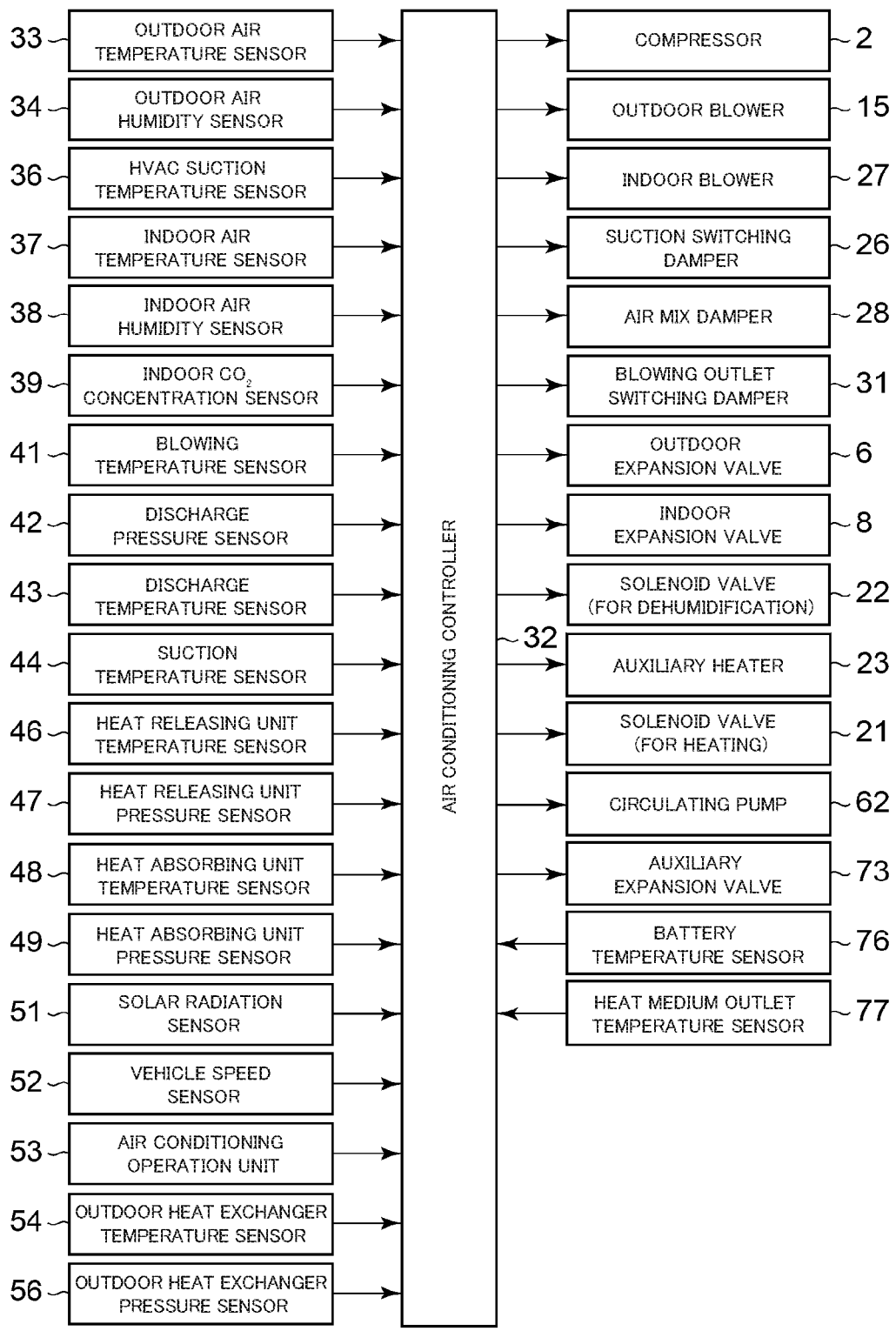
FIG. 2 is a block diagram illustrating an air conditioning controller as a controller of the vehicle air conditioning apparatus illustrated in FIG. 1.

Next, in FIG. 2, reference sign 32 denotes an air conditioning controller 32 as a controller to control the vehicle air conditioning apparatus 1. This air conditioning controller 32 is a microcomputer as an example of computer including a processor.

The output of each of: an outdoor air temperature sensor 33 configured to detect an outdoor air temperature (Tam) of the vehicle; an outdoor air humidity sensor 34 configured to detect the outdoor air humidity; an HVAC suction temperature sensor 36 configured to detect the temperature of the air sucked from the suction port 25 into the air flow passage 3; an indoor air temperature sensor 37 configured to detect the air (indoor air) in the vehicle compartment; an indoor air humidity sensor 38 configured to detect the humidity of the air in the vehicle compartment; an indoor $CO_2$ concentration sensor 39 configured to detect carbon dioxide in the vehicle compartment; a blowing temperature sensor 41 configured to detect the temperature of the air blowing from the blowing outlet 29 to the vehicle compartment; a discharge pressure sensor 42 configured to detect the pressure of the refrigerant discharged from the compressor 2 (discharge pressure Pd); a discharge temperature sensor 43 configured to detect the temperature of the refrigerant discharged from the compressor 2; a suction temperature sensor 44 configured to detect the temperature of the refrigerant sucked into the compressor 2; a heat releasing unit temperature sensor 46 configured to detect the temperature of the heat releasing unit 4 (the temperature of the air having passed through the heat releasing unit 4, or the temperature of the heat releasing unit 4 itself: heat releasing unit temperature TCI); a heat releasing unit pressure sensor 47 configured to detect the refrigerant pressure of the heat releasing unit 4 (the pressure of the refrigerant in the heat releasing unit 4, or the pressure of the refrigerant just after exiting the heat releasing unit 4: heat releasing unit pressure PCI); a heat absorbing unit temperature sensor 48 configured to detect the temperature of the heat absorbing unit 9 (the temperature of the air having passed through the heat absorbing unit 9, or the temperature of the heat absorbing unit 9 itself: heat absorbing unit temperature Te); a heat absorbing unit pressure sensor 49 configured to detect the refrigerant pressure of the heat absorbing unit 9 (the pressure of the refrigerant in the heat absorbing unit 9, or the pressure of the refrigerant just after exiting the heat absorbing unit 9); a solar radiation sensor 51 such as a photo sensor configured to detect the amount of solar radiation to the vehicle compartment; a vehicle speed sensor 52 configured to detect the movement speed of the vehicle (vehicle speed); an air conditioning operation unit 53 configured to set the preset temperature and the switching of the air conditioning operation; an outdoor heat exchanger temperature sensor 54 configured to detect the temperature of the outdoor heat exchanger 7 (the temperature of the refrigerant just after exiting the outdoor heat exchanger 7, or the temperature of the outdoor heat exchanger 7 itself:

outdoor heat exchanger temperature TXO. When the outdoor heat exchanger 7 functions as an evaporator, the outdoor heat exchanger temperature TXO is the evaporating temperature of the refrigerant in the outdoor heat exchanger 7); and an outdoor heat exchanger pressure sensor 56 configured to detect the refrigerant pressure of the outdoor heat exchanger 7 (the pressure of the refrigerant in the outdoor heat exchanger 7, or the pressure of the refrigerant just after exiting the outdoor heat exchanger 7) is connected to the input of the air conditioning controller 32 (controller).

In addition, the output of each of: a battery temperature sensor 76 configured to detect the temperature of the battery 55 (the temperature of the battery 55 itself, the temperature of the heat medium having exited the battery 55, or the temperature of the heat medium entering the battery 55: battery temperature Tb); and a heat medium outlet temperature sensor 77 configured to detect the temperature of the heat medium having exited the heat medium flow path 64A of the refrigerant-heat medium heat exchanger 64 (heat medium temperature Tw) is connected to the input of the air conditioning controller 32. With this embodiment, although the heat medium temperature Tw is an index indicating the temperature of the battery 55 (in-vehicle device), the battery temperature Tb may be adopted.

On the other hand, the compressor 2, the outdoor blower 15, the indoor blower (blower fan) 27, the suction switching damper 26, the air mix damper 28, the blowing outlet switching damper 31, the outdoor expansion valve 6, the indoor expansion valve 8, the solenoid valve 22 (for the dehumidification), the solenoid valve 21 (for the heating), the circulating pump 62, the auxiliary expansion valve 73, and the auxiliary heater 23 are connected to the output of the air conditioning controller 32. The air conditioning controller 32 controls these components based on the output of each of the sensors and the setting inputted by the air conditioning operation unit 53.

With the above-described configuration, next, the operation of the vehicle air conditioning apparatus 1 according to the embodiment will be described. With this embodiment, the air conditioning controller 32 (controller) switches among a heating and battery cooling mode (second operation mode), a cooling and battery cooling mode (first operation mode), and a dehumidification and battery cooling mode (first operation mode) and performs the mode to condition the air in the vehicle compartment, and adjusts the temperature of the battery 55 (in-vehicle device).

(1) Heating and Battery Cooling Mode (Second Operation Mode)

First, the heating and battery cooling mode as the second operation mode according to the invention will be described with reference to FIG. 1. FIG. 1 illustrates the flow of the refrigerant (indicated by dashed arrows and white arrows) in the refrigerant circuit R in this operation mode. In the winter at a low outdoor air temperature, when the heating is selected by the air conditioning controller 32 (automatic mode), or the air conditioning operation unit 53 manually operated (manual mode), the air conditioning controller 32 opens the solenoid valve 21 (for the heating), and fully closes the indoor expansion valve 8. Meanwhile, the air conditioning controller 32 closes the solenoid valve 22 (for the dehumidification).

Then, the air conditioning controller 32 operates the compressor 2, and the blowers 15 and 27, and causes the air mix damper 28 to adjust the ratio between the auxiliary heater 23 and the heat releasing unit 4 to which the air blowing from the indoor blower 27 is ventilated. By this means, gas refrigerant having a high temperature and a high pressure discharged from the compressor 2 flows into the heat releasing unit 4. The air in the air flow passage 3 is ventilated to the heat releasing unit 4, and therefore is heated by the high-temperature refrigerant in the heat releasing unit 4. Meanwhile, the air draws the heat from the refrigerant in the heat releasing unit 4, and therefore the refrigerant is cooled and consequently condensed and liquefied.

The refrigerant liquefied in the heat releasing unit 4 exits the heat releasing unit 4, and after that, passes through the refrigerant pipe 13E, the branching portion B2, and the refrigerant pipe 13J, and reaches the outdoor expansion valve 6. The refrigerant having flowed into the outdoor expansion valve 6 is decompressed there, and then flows into the outdoor heat exchanger 7. The refrigerant having flowed into the outdoor heat exchanger 7 evaporates, and draws (absorbs) the heat from the outdoor air ventilated by the running of the vehicle or by the outdoor blower 15. Then, the low-temperature refrigerant having exited the outdoor heat exchanger 7 passes through the refrigerant pipe 13A, the refrigerant pipe 13D, and the solenoid valve 21, reaches the refrigerant pipe 13C, passes through the check valve 20 of the refrigerant pipe 13C, enters the accumulator 12, and is separated into gas and liquid, and then the gas refrigerant is sucked into the compressor 2. This circulation of the refrigerant is repeated. The air heated in the heat releasing unit 4 blows from the blowing outlet 29, and therefore the vehicle compartment is heated.

The air conditioning controller 32 calculates a target heat releasing unit pressure PCO (the target value of the pressure PCI of the heat releasing unit 4) from a target heater temperature TCO (the target value of the temperature of the air downwind of the heat releasing unit 4) which is calculated from a target blowing temperature TAO described later, and controls the number of rotations of the compressor 2, based on the target heat releasing unit pressure PCO and the refrigerant pressure of the heat releasing unit 4 (heat releasing unit pressure PCI; the high pressure of the refrigerant circuit R) detected by the heat releasing unit pressure sensor 47. The air conditioning controller 32 also controls the degree of opening of the outdoor expansion valve 6, based on the temperature of the heat releasing unit 4 (heat releasing unit temperature TCI) detected by the heat releasing unit sensor 46 and the heat releasing unit pressure PCI detected by the heat releasing unit pressure sensor 47, and controls the degree of supercooling of the refrigerant at the outlet of the heat releasing unit 4.

The target heater temperature TCO is basically TCO=TAO, but a predetermined limit for the control is set. In addition, when the heating performance of the heat releasing unit 4 is not sufficient, it is complemented by sending an electric current to the auxiliary heater 23 to generate heat.

In addition, the air conditioning controller 32 opens the solenoid valve 22 and also the auxiliary expansion valve 73, and controls the degree of opening of them. By this means, part of the refrigerant having exited the heat releasing unit 4 is branched by the branching portion B2, passes through the refrigerant pipe 13F (bypass circuit), and reaches the upstream of the indoor expansion valve 8 with respect to the refrigerant flow as indicated by the white arrows in FIG. 1. Next, the refrigerant enters the branching pipe 72 and is decompressed by the auxiliary expansion valve 73, and after that, passes through the branching pipe 72, flows into the refrigerant flow path 64B of the refrigerant-heat medium heat exchanger 64 (in-vehicle device heat exchanger), and evaporates. At this time, the refrigerant exerts heat absorption effect. The refrigerant having evaporated in the refrigerant flow path 64B passes through the refrigerant pipe 74, the refrigerant pipe 13C, and the accumulator 12 in sequence, and is sucked into the compressor 2. This circulation of the refrigerant is repeated.

Moreover, the air conditioning controller 32 operates the circulating pump 62 of the heat medium circulation circuit 61. By this means, the heat medium discharged from the circulating pump 62 flows into the heat medium flow path 64A of the refrigerant-heat medium heat exchanger 64, and the heat of the heat medium is absorbed into the refrigerant evaporating in the refrigerant flow path 64B as described above. The heat medium cooled by the refrigerant in the heat medium flow path 64A is circulated through the battery 55, and subjected to a heat exchange with the battery 55, and then sucked into the circulating pump 62 (indicated by solid arrows). By this means, waste heat is collected from the battery 55, and the battery 55 itself is cooled. The waste heat collected in the heat medium is drawn into the refrigerant in the refrigerant-heat medium heat exchanger 64, conveyed to the heat releasing unit 4, and used to heat the vehicle compartment.

The air conditioning controller 32 controls the degree of opening (including full close) of the auxiliary expansion valve 73 so that the heat medium temperature Tw detected by the heat medium outlet temperature sensor 77 becomes a target heat medium temperature TWO which is the target value of the heat medium temperature Tw, based on the heat medium temperature Tw and the target heat medium temperature TWO. Here, in the state where the refrigerant absorbs the heat in the refrigerant-heat medium heat exchanger 64, the heat absorption from the outdoor air in the outdoor heat exchanger 7 may be stopped, as long as the heating performance of the heat releasing unit 4 is fulfilled. In this case, the outdoor expansion valve 6 is fully closed to prevent the refrigerant from flowing into the outdoor heat exchanger 7. Here, the target heat medium temperature TWO is a predetermined heat medium temperature Tw which is the suitable temperature of the battery 55.

(2) Dehumidification and Battery Cooling Mode (First Operation Mode)

Figure 3:
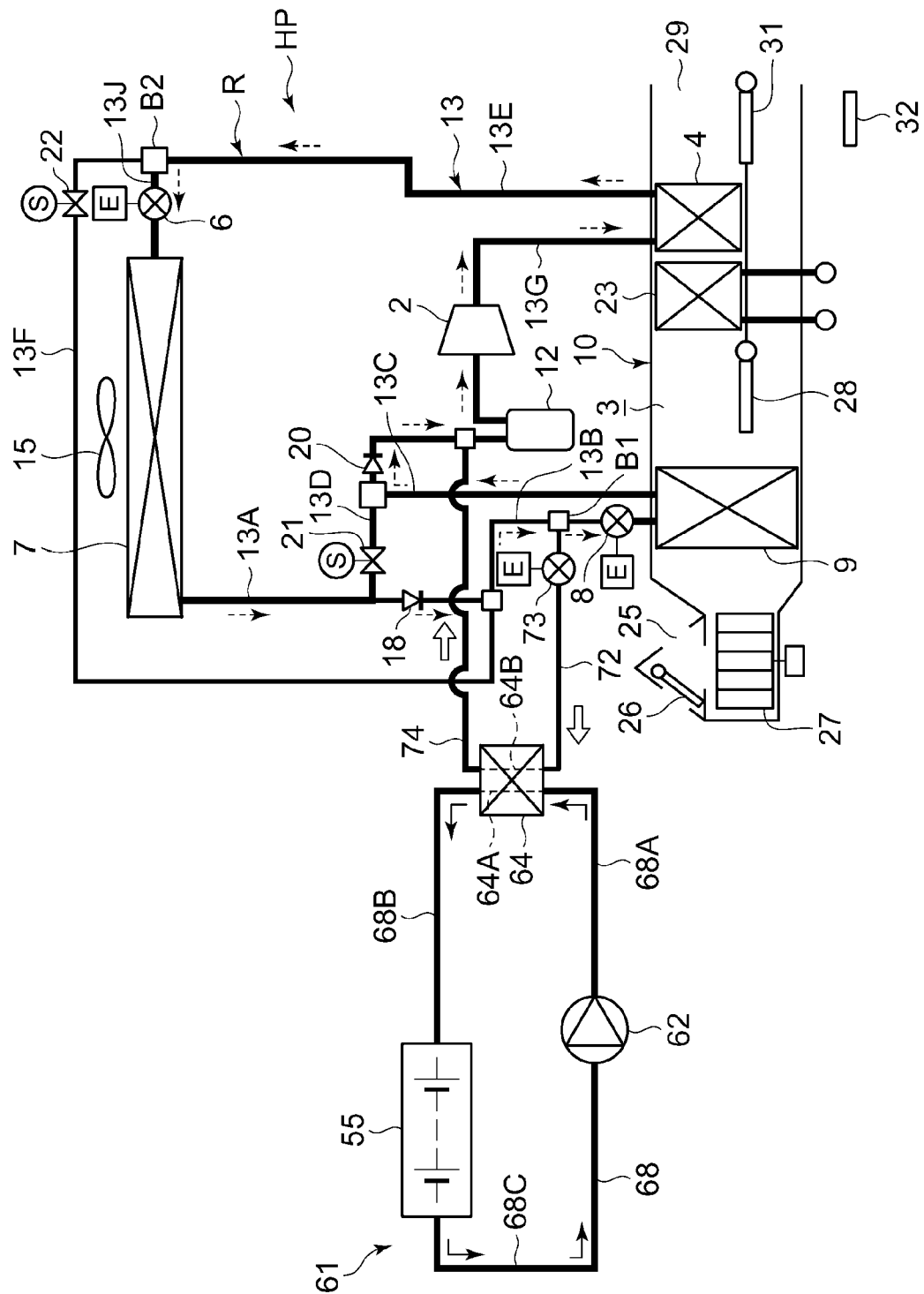
FIG. 3 illustrates a dehumidification and battery cooling mode (a first operation mode) and a cooling and battery cooling mode (the first operation mode) by the air conditioning controller illustrated in FIG. 2.

Next, the humidification and battery cooling mode as the first operation mode according to the invention will be described with reference to FIG. 3. FIG. 3 illustrates the flow of the refrigerant (indicated by dashed arrows and white arrows) in the refrigerant circuit R in this operation mode. In the dehumidification and battery cooling mode, the air conditioning controller 32 opens the indoor expansion valve 8 to decompress and expand the refrigerant, and closes the solenoid valve 21 and the solenoid valve 22. Then, the air conditioning controller 32 operates the compressor 2, and the blowers 15 and 27, and causes the air mix dumper 28 to adjust the ratio between the auxiliary heater 23 and the heat releasing unit 4 to which the air blowing from the indoor blower 27 is ventilated.

By this means, gas refrigerant having a high temperature and a high pressure discharged from the compressor 2 flows into the heat releasing unit 4. The air in the air flow passage 3 is ventilated to the heat releasing unit 4, and therefore is heated by the high-temperature refrigerant in the heat releasing unit 4. Meanwhile, the air draws the heat from the refrigerant in the heat releasing unit 4, and therefore the refrigerant is cooled and consequently condensed and liquefied.

The refrigerant having exited the heat releasing unit 4 passes through the refrigerant pipe 13E, reaches and passes through the outdoor expansion valve 6 which is controlled to be slightly open, and flows into the outdoor heat exchanger 7. The refrigerant having flowed into the outdoor heat exchanger 7 is cooled by the outdoor air which is ventilated by the running of the vehicle or by the outdoor blower 15, and condensed. The refrigerant having exited the outdoor heat exchanger 7 passes through the refrigerant pipe 13A and the check valve 18, enters the refrigerant pipe 13B, passes through the branching portion B1 (first branching portion), and reaches the indoor expansion valve 8. The refrigerant is decompressed by the indoor expansion valve 8, and then flows into the heat absorbing unit 9 and evaporates. By the heat absorption effect generated at this time, the moisture of the air blowing from the indoor blower 27 is condensed and adheres to the heat absorbing unit 9, and therefore the air is cooled and dehumidified.

The refrigerant having evaporated in the heat absorbing unit 9 passes through the refrigerant pipe 13C and the check valve 20, reaches and passes through the accumulator 12, and then is sucked into the compressor 2. This circulation of the refrigerant is repeated. The air cooled and dehumidified in the heat absorbing unit 9 is reheated (with the heat releasing performance lower than that of the heating) while passing through the heat releasing unit 4. By this means, the vehicle compartment is cooled and dehumidified.

Moreover, the air conditioning controller 32 opens the auxiliary expansion valve 73 and controls the degree of opening of the auxiliary expansion valve 73. By this means, part of the refrigerant having exited the outdoor heat exchanger 7 and flowed into the refrigerant pipe 13B is branched by the branching portion B1, enters the branching pipe 72, is decompressed by the auxiliary expansion valve 73, and then passes through the branching pipe 72, flows into the refrigerant flow path 64B of the refrigerant-heat medium heat exchanger 64 (in-vehicle device heat exchanger) and evaporates as indicated by the white arrow in FIG. 3. At this time, the refrigerant exerts heat absorption effect. The refrigerant having evaporated in the refrigerant flow path 64B passes through the refrigerant pipe 74, the refrigerant pipe 13C and accumulator 12 in sequence, and is sucked into the compressor 2. This circulation of the refrigerant is repeated.

Moreover, the air conditioning controller 32 operates the circulating pump 62 of the heat medium circulation circuit 61. By this means, the heat medium discharged from the circulating pump 62 flows into the heat medium flow path 64A of the refrigerant-heat medium heat exchanger 64, and the heat of the heat medium is absorbed into the refrigerant evaporating in the refrigerant flow path 64B as described above. The heat medium cooled by the refrigerant in the heat medium flow path 64A is circulated through the battery 55, and subjected to a heat exchange with the battery 55, and then sucked into the circulating pump 62 (indicated by solid arrows). By this means, the battery 55 is cooled.

The air conditioning controller 32 controls the number of rotations of the compressor 2 so that the heat medium temperature Tw detected by the heat medium outlet temperature sensor 77 becomes the target heat medium temperature TWO which is the target value of the heat medium temperature Tw, based on the heat medium temperature Tw and the target heat medium temperature TWO, and controls the degree of opening of the outdoor expansion valve 6 so that the heat releasing unit pressure PCI (the high pressure of the refrigerant circuit R) detected by the heat releasing unit pressure sensor 47 becomes the target heat releasing unit pressure PCO (the target value of the heat releasing unit pressure PCI) calculated from the target heater temperature TCO, based on the heat releasing unit pressure PCI and the target heat releasing unit pressure PCO to obtain a necessary amount of heat for the reheating by the heat releasing unit 4.

In addition, the air conditioning controller 32 controls the degree of opening of the indoor expansion valve 8 so that the heat absorbing unit temperature Te becomes a target heat absorbing unit temperature TEO, based on the heat absorbing unit temperature Te and the target heat absorbing unit temperature TEO. Then, when the heat absorbing unit temperature Te is equal to or lower than the target heat absorbing unit temperature TEO, the air conditioning controller 32 fully closes the indoor expansion valve 8. Here, the target heat absorbing unit temperature TEO is a predetermined heat absorbing unit temperature Te which can fulfil the cooling performance required for the heat absorbing unit 9.

(3) Cooling and Battery Cooling Mode (First Operation Mode)

Next, the cooling and battery cooling mode will be described. In this cooling and battery cooling mode performed in the summer at a high outdoor air temperature, the air conditioning controller 32 maximizes the degree of opening (full open) of the outdoor expansion valve 6 in the humidification and battery cooling mode. Here, the air conditioning controller 32 causes the air mix damper 28 to adjust the ratio between the auxiliary heater 23 and the heat releasing unit 4 to which the air is ventilated.

By this means, the gas refrigerant having a high temperature and a high pressure discharged from the compressor 2 flows into the heat releasing unit 4 as indicated by the dashed arrows in FIG. 3 in the same way. In the cooling and battery cooling mode, the air in the air flow passage 3 is hardly ventilated to the heat releasing unit 4, or, even when the air in the air flow passage 3 is ventilated to the heat releasing unit 4, the ratio is small (only for the reheating of the cooling). The refrigerant having released the heat for the reheating of the cooling in the heat releasing unit 4 passes through the refrigerant pipe 13E, and reaches the outdoor expansion valve 6. At this time, the outdoor expansion valve 6 is fully open, and therefore the refrigerant can pass through the outdoor expansion valve 6, passes through the refrigerant pipe 13J, flows into the outdoor heat exchanger 7, and is cooled by the outdoor air which is ventilated by the running of the vehicle or by the outdoor blower 15, and condensed and liquefied.

The refrigerant having exited the outdoor heat exchanger 7 passes through the refrigerant pipe 13A and the check valve 18, enters the refrigerant pipe 13B and reaches the indoor expansion valve 8. The refrigerant is decompressed by the indoor expansion valve 8, and then flows into the heat absorbing unit 9 and evaporates. By the heat absorption effect generated at this time, the moisture of the air blowing from the indoor blower 27 is condensed and adheres to the heat absorbing unit 9, and therefore the air is cooled.

The refrigerant having evaporated in the heat absorbing unit 9 passes through the refrigerant pipe 13C and the check valve 20, reaches the accumulator 12, and then is sucked into the compressor 2. This circulation of the refrigerant is repeated. The air cooled and dehumidified in the heat absorbing unit 9 blows from the blowing outlet 29 to the vehicle compartment, and therefore the vehicle compartment is cooled.

In addition, also in the cooling and battery cooling mode, the air conditioning controller 32 opens the auxiliary expansion valve 73 and controls the degree of opening of the auxiliary expansion valve 73. By this means, part of the refrigerant having exited the outdoor heat exchanger 7 and flowed into the refrigerant pipe 13B is branched by the branching portion B1, enters the branching pipe 72, is decompressed by the auxiliary expansion valve 73, and then passes through the branching pipe 72, flows into the refrigerant flow path 64B of the refrigerant-heat medium heat exchanger 64, and evaporates as indicated by the white arrow in FIG. 3. At this time, the refrigerant exerts heat absorption effect. The refrigerant having evaporated in the refrigerant flow path 64B passes through the refrigerant pipe 74, the refrigerant pipe 13C and accumulator 12 in sequence, and is sucked into the compressor 2. This circulation of the refrigerant is repeated.

Moreover, the air conditioning controller 32 operates the circulating pump 62 of the heat medium circulation circuit 61. By this means, the heat medium discharged from the circulating pump 62 flows into the heat medium flow path 64A of the refrigerant-heat medium heat exchanger 64, and the heat of the heat medium is absorbed into the refrigerant evaporating in the refrigerant flow path 64B as described above. The heat medium cooled by the refrigerant in the heat medium flow path 64A is circulated through the battery 55, and subjected to a heat exchange with the battery 55, and then sucked into the circulating pump 62 (indicated by the solid arrows). By this means, the battery 55 is cooled.

The air conditioning controller 32 controls, also in this operation mode, the number of rotations of the compressor 2 so that the heat medium temperature Tw detected by the heat medium outlet temperature sensor 77 becomes the target heat medium temperature TWO which is the target value of the heat medium temperature Tw, based on the heat medium temperature Tw and the target heat medium temperature TWO, and controls the degree of opening of the outdoor expansion valve 6 so that the heat releasing unit pressure PCI (the high pressure of the refrigerant circuit R) detected by the heat releasing unit pressure sensor 47 becomes the target heat releasing unit pressure PCO (the target value of the heat releasing unit pressure PCI) calculated from the target heater temperature TCO, based on the heat releasing unit pressure PCI and the target heat releasing unit pressure PCO to obtain a necessary amount of heat for the reheating by the heat releasing unit 4.

In addition, the air conditioning controller 32 controls the degree of opening of the indoor expansion valve 8 so that the heat absorbing unit temperature Te becomes the target heat absorbing unit temperature TEO, based on the heat absorbing unit temperature Te and the target heat absorbing unit temperature TEO. Then, when the heat absorbing unit temperature Te is equal to or lower than the target heat absorbing unit temperature TEO, the air conditioning controller 32 fully closes the indoor expansion valve 8.

(8) Switching Control of the Operation Mode

The air conditioning controller 32 calculates the above-described target blowing temperature TAO from the following equation (I). The target blowing temperature TAO is a target value of the temperature of the air blowing from the blowing outlet 29 to the vehicle compartment.

$$TAO = (Tset - Tin) \times K + Tbal(f(Tset, SUN, Tam)) \tag{I}$$

where Tset denotes a preset temperature in the vehicle compartment set by the air conditioning operation unit 53; Tin denotes a temperature of the air in the vehicle compartment detected by the indoor air temperature sensor 37; K denotes a coefficient; and Tbal is a balance value calculated from the preset temperature Tset, an amount of solar radiation SUN detected by the solar radiation sensor 51 and the outdoor air temperature Tam detected by the outdoor air temperature sensor 33. Then, in general, the lower the outdoor air temperature Tam is, the higher the target blowing temperature TAO is, and the target blowing temperature TAO is reduced as the outdoor air temperature Tam is increased.

Then, when being started, the air conditioning controller 32 selects one of the above-described operation modes, based on the outdoor air temperature Tam detected by the outdoor air temperature sensor 33 and the target blowing temperature TAO.

In addition, after being started, the air conditioning controller 32 selects and switches the operation mode depending on changes in the environment such as the outdoor air temperature Tam and the target blowing temperature TAO, and the settings. Here, the switching from the cooling and battery cooling mode or the dehumidification and battery cooling mode (the first operation mode) to the heating and battery cooling mode (the second operation mode) is performed as follows.

(8-1) Control of the Switching from the First Operation Mode (the Cooling and Battery Cooling Mode, or the Dehumidification and Battery Cooling Mode) to the Second Operation Mode (the Heating and Battery Cooling Mode)

In the case where the air conditioning controller 32 performs the cooling and battery cooling mode or the dehumidification and battery cooling mode (first operation mode) as illustrated in FIG. 3, when the heat absorbing unit temperature Te is reduced, for example, the heat absorbing unit temperature Te is equal to or lower than the target heat absorbing unit temperature TEO, the air conditioning controller 32 fully closes the indoor expansion valve 8 to prevent the refrigerant from flowing into the heat absorbing unit 9 as described above. It is because the outdoor air temperature is reduced, and therefore there is no need to flow the refrigerant to the heat absorbing unit 9.

In this way, even though the indoor expansion valve 8 is fully closed, when the heat absorbing unit temperature Te is reduced, and is lower than the target heat absorbing unit temperature TEO (the heat absorbing unit temperature Te is lower than the target heat absorbing unit temperature TEO), and, for example, a predetermined period of time (a predetermined short period of time to assure the safety of the operation) has elapsed in this state, the air conditioning controller 32 moves the operation mode to the heating and battery cooling mode illustrated in FIG. 1.

By this means, in the state where there is no need to flow the refrigerant to the heat absorbing unit 9 when the cooling and battery cooling mode or the dehumidification and battery cooling mode is performed, it is possible to move the operation mode to the heating and battery cooling mode to improve the heating performance to heat the vehicle compartment. In addition, there is no need to continue the cooling and battery cooling mode or the dehumidification and battery cooling mode and perform the auxiliary heating by the auxiliary heater 23, and therefore it is possible to contribute to energy saving.

Here, the operation control of the cooling and battery cooling mode or the dehumidification and battery cooling mode is not limited to the above-described embodiment. For example, the present invention is effective for an embodiment where, for example, the operation of the compressor 2 is controlled based on the heat absorbing unit temperature Te and the target heat absorbing unit temperature TEO, and the auxiliary expansion valve 73 is controlled based on the heat medium temperature Tw and the target heat medium temperature TWO; and, when the heat absorbing unit temperature Te is lower than the target heat absorbing unit temperature TEO (Te<TEO), the indoor expansion valve 8 is fully closed, and the compressor 2 is controlled based on the heat medium temperature Tw and the target heat medium temperature TWO.

In addition, with the above-described embodiment, the battery 55 is adopted as an in-vehicle device, but this is by no means limiting. The present invention is effective for a traction electric motor and an inverter to drive the traction electric motor. Moreover, with the above-described embodiment, the indoor expansion valve 8 as an electric expansion valve which can be fully closed is adopted as a heat absorbing unit valve device, but this is by no mean limiting. A combination of a mechanical expansion valve and a solenoid valve is possible.

Furthermore, the configuration of the air conditioning controller 32, and the configurations of the heat pump device HP and the heat medium circulation circuit 61 of the vehicle air conditioning apparatus 1 are not limited to the above-described embodiment, but can be modified without departing from the scope of the invention.

REFERENCE SIGNS LIST 1 vehicle air conditioning apparatus
2 compressor
4 heat releasing unit
6 outdoor expansion valve (outdoor heat exchanger valve device)
7 outdoor heat exchanger
8 indoor expansion valve (heat absorbing unit valve device)
9 heat absorbing unit
32 air conditioning controller (controller)
55 battery (in-vehicle device)
61 heat medium circulation circuit
62 circulating pump
64 refrigerant-heat medium heat exchanger (in-vehicle device heat exchanger)
68 heat medium pump
72 branching pipe
73 auxiliary expansion valve
B1 branching portion (first branching portion)
B2 branching portion (second branching portion)

The invention claimed is:

1. A vehicle air conditioning apparatus comprising:
a compressor configured to compress a refrigerant;
a heat releasing unit configured to release heat from the refrigerant and heat air to be supplied to a vehicle compartment;
an outdoor heat exchanger provided outside the vehicle compartment and configured to absorb the heat into the refrigerant or release the heat from the refrigerant;
a heat absorbing unit configured to absorb the heat into the refrigerant and cool the air to be supplied to the vehicle compartment;
an in-vehicle device heat exchanger configured to absorb the heat into the refrigerant and cool an in-vehicle device;
an outdoor heat exchanger valve device configured to control flowing of the refrigerant into the outdoor heat exchanger;
a heat absorbing unit valve device configured to control flowing of the refrigerant into the heat absorbing unit; and
a controller configured to be able to perform at least:
a first operation mode to cool the vehicle compartment and the in-vehicle device by releasing the heat from the refrigerant discharged from the compressor in the heat releasing unit and/or the outdoor heat exchanger and absorbing the heat into the refrigerant in the heat absorbing unit and the in-vehicle device heat exchanger; and a second operation mode to heat the vehicle compartment and cool the in-vehicle device by releasing the heat from the refrigerant discharged from the compressor in the heat releasing unit and absorbing the heat into the refrigerant in the outdoor heat exchanger and/or the in-vehicle device heat exchanger, wherein, in a case where the first operation mode is performed, when a temperature of the heat absorbing unit is lower than a target value of the temperature of the heat absorbing unit even though the heat absorbing unit valve device prevents the refrigerant from flowing into the heat absorbing unit, the controller moves the operation mode to the second operation mode.

2. The vehicle air conditioning apparatus according to claim 1, wherein:
  in the first operation mode, the controller controls operation of the compressor based on an index indicating a temperature of the in-vehicle device, and controls the heat absorbing unit valve device based on the temperature of the heat absorbing unit; and
  in a case where the first operation mode is performed, when the temperature of the heat absorbing unit is lower than the target value of the temperature of the heat absorbing unit even though the heat absorbing unit valve device becomes a state to prevent the refrigerant from flowing into the heat absorbing unit, the controller moves the operation mode to the second operation mode.

3. The vehicle air conditioning apparatus according to claim 2, wherein the heat absorbing unit and the in-vehicle device heat exchanger are connected in parallel downstream of a first branching portion with respect to refrigerant flow, the first branching portion being located on an outlet side of the outdoor heat exchanger from which the refrigerant is discharged.

4. The vehicle air conditioning apparatus according to claim 2, wherein the outdoor heat exchanger valve device is an electric expansion valve which can be fully closed.

5. The vehicle air conditioning apparatus according to claim 2, wherein the heat absorbing unit valve device is an electric expansion valve which can be fully closed, or a combination of an expansion valve and a solenoid valve.

6. The vehicle air conditioning apparatus according to claim 2, further comprising an auxiliary expansion valve configured to decompress the refrigerant flowing into the in-vehicle device heat exchanger.

7. The vehicle air conditioning apparatus according to claim 1, wherein the heat absorbing unit and the in-vehicle device heat exchanger are connected in parallel downstream of a first branching portion with respect to refrigerant flow, the first branching portion being located on an outlet side of the outdoor heat exchanger from which the refrigerant is discharged.

8. The vehicle air conditioning apparatus according to claim 7, wherein the outdoor heat exchanger valve device is an electric expansion valve which can be fully closed.

9. The vehicle air conditioning apparatus according to claim 7, wherein the heat absorbing unit valve device is an electric expansion valve which can be fully closed, or a combination of an expansion valve and a solenoid valve.

10. The vehicle air conditioning apparatus according to claim 7, further comprising:
  a bypass circuit branching from a second branching portion located on an outlet side of the heat releasing unit from which the refrigerant is discharged, and configured to bypass the outdoor heat exchanger and communicate with the first branching portion; and
  a bypass circuit valve device configured to control flowing of the refrigerant into the bypass circuit.

11. The vehicle air conditioning apparatus according to claim 10, wherein the outdoor heat exchanger valve device is an electric expansion valve which can be fully closed.

12. The vehicle air conditioning apparatus according to claim 10, wherein the heat absorbing unit valve device is an electric expansion valve which can be fully closed, or a combination of an expansion valve and a solenoid valve.

13. The vehicle air conditioning apparatus according to claim 10, wherein:
  in the first operation mode, the controller flows the refrigerant discharged from the compressor in an order of the outdoor heat exchanger valve device, the outdoor heat exchanger, the first branching portion, the heat absorbing unit valve device, and the heat absorbing unit, branches the refrigerant by the first branching portion, and flows the refrigerant to the in-vehicle device heat exchanger; and
  in the second operation mode, the controller flows the refrigerant discharged from the compressor in an order of the heat releasing unit, the second branching portion, the outdoor heat exchanger valve device, and the outdoor heat exchanger, branches the refrigerant from the second branching portion into the bypass circuit, and flows the refrigerant to the in-vehicle device heat exchanger.

14. The vehicle air conditioning apparatus according to claim 13, wherein the outdoor heat exchanger valve device is an electric expansion valve which can be fully closed.

15. The vehicle air conditioning apparatus according to claim 13, further comprising an auxiliary expansion valve configured to decompress the refrigerant flowing into the in-vehicle device heat exchanger.

16. The vehicle air conditioning apparatus according to claim 1, wherein the outdoor heat exchanger valve device is an electric expansion valve which can be fully closed.

17. The vehicle air conditioning apparatus according to claim 16, wherein the heat absorbing unit valve device is an electric expansion valve which can be fully closed, or a combination of an expansion valve and a solenoid valve.

18. The vehicle air conditioning apparatus according to claim 1, wherein the heat absorbing unit valve device is an electric expansion valve which can be fully closed, or a combination of an expansion valve and a solenoid valve.

19. The vehicle air conditioning apparatus according to claim 18, further comprising an auxiliary expansion valve configured to decompress the refrigerant flowing into the in-vehicle device heat exchanger.

20. The vehicle air conditioning apparatus according to claim 1, further comprising an auxiliary expansion valve configured to decompress the refrigerant flowing into the in-vehicle device heat exchanger.

* * * * *